United States Patent [19]

Gerard

[11] Patent Number: 5,718,375
[45] Date of Patent: Feb. 17, 1998

[54] AUXILIARY MOTOR VEHICLE HEATING SYSTEM

[76] Inventor: Frank J. Gerard, 501 Heath Ave., North Linthicum, Md. 21090

[21] Appl. No.: 644,164

[22] Filed: May 10, 1996

[51] Int. Cl.⁶ .................................................. B60H 1/02
[52] U.S. Cl. ........................... 237/12.3 R; 237/12.3 C; 237/2 A; 126/247
[58] Field of Search ............... 237/12.3 C, 2 A, 237/12.3 R; 122/26; 126/247

[56] References Cited

U.S. PATENT DOCUMENTS

| | | | |
|---|---|---|---|
| 3,198,176 | 8/1965 | Helmer | 122/26 |
| 4,860,951 | 8/1989 | Waas | 237/2 A |
| 4,871,113 | 10/1989 | Kawamura | 237/12.3 C |
| 5,025,985 | 6/1991 | Enander | 237/2 A |

Primary Examiner—Henry A. Bennett
Assistant Examiner—Derek S. Boles
Attorney, Agent, or Firm—Michael W. York

[57] ABSTRACT

An auxiliary motor vehicle heating system that supplements the motor vehicle's main heating system. The auxiliary motor vehicle heating system is not dependent upon the same heat energy source as the motor vehicle's main heating system. Consequently, the auxiliary heating system can provide heat when the main heating system is not able to provide heat. This permits the auxiliary motor vehicle heating system to operate and provide heat when the main motor vehicle heating system is not capable of providing heat. Consequently, this invention provides the capability for the windshield and other glass areas of the vehicle to be cleared and heat provided to the occupants of the vehicle even when the motor vehicle engine is not operating and warm. In one embodiment, the heating system is also capable of providing cooling air for cooling as an alternative to heat.

5 Claims, 3 Drawing Sheets

AUXILIARY MOTOR VEHICLE HEATING SYSTEM

BACKGROUND OF THE INVENTION

Conventional automobiles and related land motor vehicles provide heat to their occupants by directing cooling fluid from the engine to a heater where air is blown through coils or the like so that the air picks up heat that is then directed in a direction to provide heat to the occupants. This arrangement has numerous disadvantages. The most obvious and primary disadvantage is that the system will not function until the engine has been started and has been running for a sufficient time for the engine or motor to heat up and transfer heat to the cooling fluid that circulates within the engine. This means that the occupants of the vehicle have no adequate heating until the engine is started and allowed to warm up by being run. This problem becomes more severe when the outside temperature is low so that the engine can only warm up slowly.

Even when the engine is warm it is difficult to get adequate heat to all of the occupants of the vehicle since the heater unit is usually located in the forward part of the vehicle near the engine and hence the hot or warm air from the heater unit must be blown to the other portions of the vehicle in an attempt to heat all of the occupants of the vehicle. Due to heat loses associated with the ducts and the distance from the heater, the occupants that are more remote from the heater typically receive less heat than the occupants that are closest to the heater. In addition, individuals differ in their desires for heat and the conventional motor vehicle heating system is only controlled from the dash board of the vehicle and does not allow the individual occupant to have individualized heat, much less the ability to have individual control over the occupant's local heat environment.

There are other significant problems, with the current motor vehicle heating systems than those associated with providing heat or adequate heat to the occupants or passengers. Typically, when there is cold weather and any significant humidity, frost or ice will form on the windshield and other glass or window areas of the vehicle. In order to operate the vehicle safely this frost or ice must be removed. Typically, this removal is accomplished manually or by heating elements or wires in the case of the rear vehicle glass that are embedded in the glass itself. However, embedded wires and the like would interfere with the visibility available through the front windshield and even the side vehicle glass and hence these are not practical. In addition, typically even the rear glass heating elements are not capable of being energized until the engine of the vehicle is started. Consequently, the current motor vehicle heating systems do not permit the easy clearing of the windshield and other glass areas so that good visibility for the occupants of the vehicle is assured in cold weather before the vehicle has been started and the engine has been thoroughly warmed up.

Current motor vehicles, such as recreational vehicles, are likely to have occupants, even when the engine would normally not be running. Consequently, the occupants in cold weather have no heat from the vehicle when they are occupying the vehicle, but the engine is not running since the engine produces no heat that can be conveyed to the occupants.

This auxiliary motor vehicle heating system invention overcomes these previous problems associated with the current automobiles and related motor vehicles that provide no heat until the engine is warmed up and then possibly inadequate or localized heat. With this auxiliary motor vehicle heating system heat is available for the interior of the motor vehicle even though the engine is not running or has not been warmed up. Moreover, this invention overcomes the inadequate heating associated with the conduction of heated air from the engine to various portions of the interior of the vehicle by providing individual independent auxiliary heat sources that operate independently of the motor vehicle engine and hence do not require the motor vehicle engine to be operating and to be warm to be operational.

With this auxiliary motor vehicle heating system, heat for the occupants of a motor vehicle is provided even though the engine of the vehicle is not running. Also, the amount of heat can be adjusted to suit the individual's desires which is not possible with present heating systems. In addition, the present invention greatly increases the safety of the vehicle by allowing adequate defrosting or clearing of the windshield and other vehicle glass even though the motor vehicle's engine has not been warmed up. With this invention it is also possible to provide an emergency source of heat for the motor vehicle occupants in the event that the motor vehicle motor and primary source of heat for the occupants and or its cooling/heating system should become inoperable.

SUMMARY OF THE INVENTION

This invention relates to motor vehicle heating systems and more particularly to motor vehicle heating systems for the interior of the motor vehicle.

Accordingly, it is an object of the invention to provide an auxiliary heating system for the interior of a motor vehicle that is always available.

It is an object of the invention to provide an auxiliary heating system for the interior of a motor vehicle that is not dependent upon engine heat.

It is an object of the invention to provide an auxiliary heating system for the interior of a motor vehicle that has multiple uses.

It is an object of the invention to provide an auxiliary heating system for the interior of a motor vehicle that can increase vehicle safety.

It is an object of the invention to provide an auxiliary heating system for the interior of a motor vehicle that can increase the occupants' comfort.

It is an object of the invention to provide an auxiliary heating system for the interior of a motor vehicle that is capable of being used in a wide range of motor vehicles.

It is an object of the invention to provide an auxiliary heating system for the interior of a motor vehicle that does not require significant redesign of the motor vehicle.

It is an object of the invention to provide an auxiliary heating system for the interior of a motor vehicle that is easy to install.

It is an object of the invention to provide an auxiliary heating system for the interior of a motor vehicle that can be used to retrofit existing motor vehicles.

It is an object of the invention to provide an auxiliary heating system for the interior of a motor vehicle that requires little or no modification of the motor vehicle structure.

It is an object of the invention to provide an auxiliary heating system for the interior of a motor vehicle that is low in cost.

It is an object of the invention to provide an auxiliary heating system for the interior of a motor vehicle that is easy to manufacture.

It is an object of the invention to provide an auxiliary heating system for the interior of a motor vehicle that has no adverse environmental implications.

These and other objects of the invention will be apparent from the auxiliary motor vehicle heating system invention that includes magnetic heat means for generating heat, power means for providing power to the magnetic heat generating means and means for directing the magnetically generated heat to the desired location within the motor vehicle. The auxiliary motor vehicle heating system supplements the motor vehicle's main heating system and is not dependent upon the same heat energy source as the motor vehicle's main heating system. This permits the auxiliary motor vehicle heating system to operate and provide heat when the main motor vehicle heating system is not able to provide heat. Consequently, this auxiliary motor vehicle heating system invention provides the capability for the windshield and other glass areas of the motor vehicle to be cleared and heat provided to the occupants of the vehicle even when the motor vehicle engine is not operating and warm.

BRIEF DESCRIPTION OF THE DRAWINGS

The invention will be hereinafter more fully described with reference to the accompanying drawings in which.

DETAILED DESCRIPTION OF THE PREFERRED EMBODIMENTS

Figure 1:
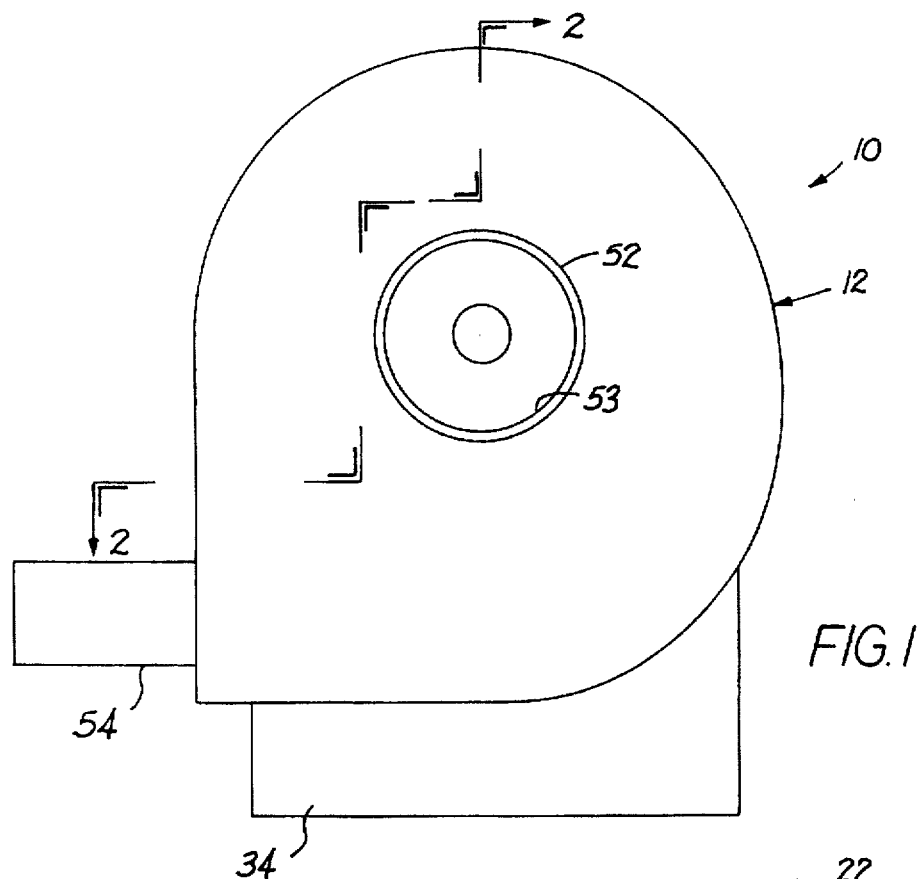
FIG. 1 is a front elevational view of a portion of the auxiliary motor vehicle heating system invention.
Figure 2:
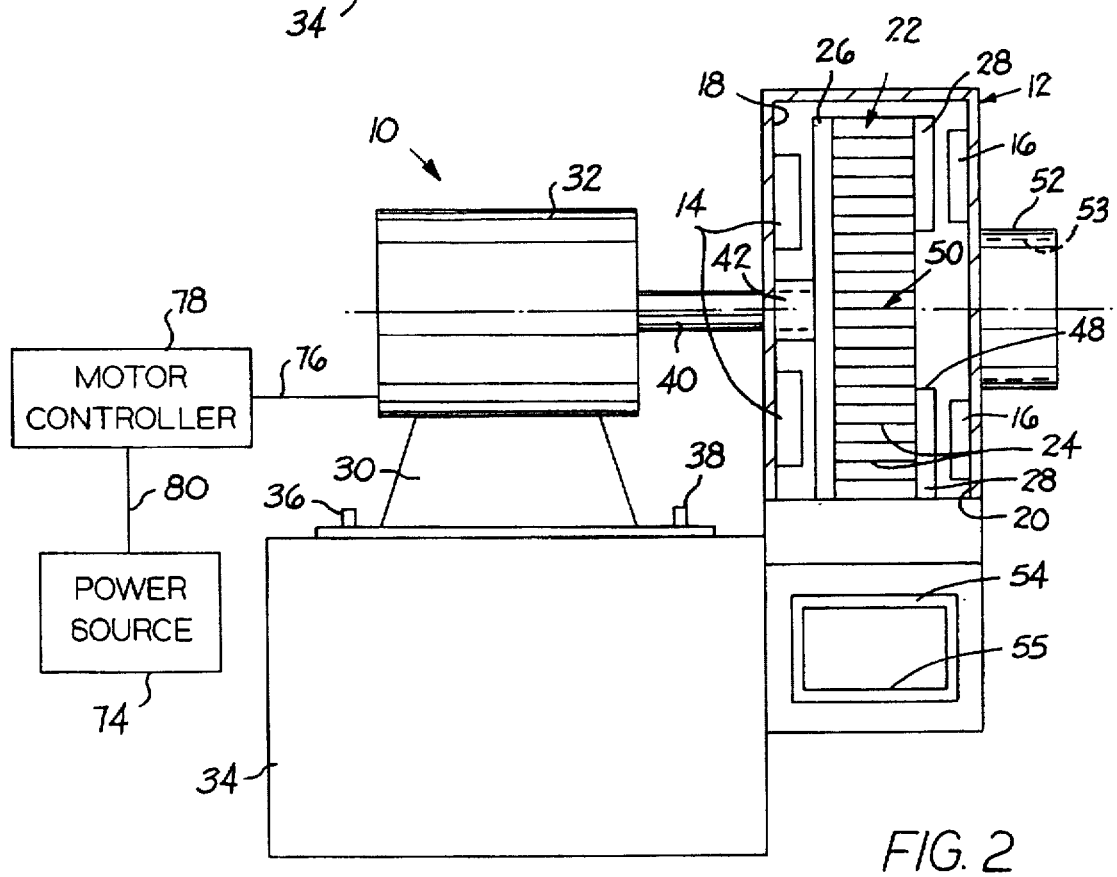
FIG. 2 is a side elevational view of the portion of the auxiliary motor vehicle heating system invention illustrated in FIG. 1 with a portion partially in section taken substantially on the line 2—2 in FIG. 1.

Referring first to FIGS. 1 and 2, an important portion of the auxiliary motor vehicle heating system comprising a heat generator is illustrated and is designated generally by the number 10. The heat generator 10 is a permanent magnet heating unit that includes a fan housing 12, a double set of permanent magnets each designated generally by the numbers 14 and 16 with one set on each side of the inside walls 18 and 20 of the fan housing, a fan assembly 22 with copper or aluminum fan blades 24 and a set of copper or aluminum heat absorption plates designated by the numbers 26 and 28 with one on each side of the copper or aluminum fan blade assembly 22. This arrangement permits the fan assembly 22 to be heated more uniformly and to a higher degree of temperature than other previous experimental arrangements.

The permanent magnet heat generator 10 also comprises a motor base 30 and an AC or DC motor drive unit 32 which is attached to the motor base 30. This motor base 30 sits on a fan housing base 34 of the fan housing 12 and is secured thereto by two bolts 36 and 38. The permanent magnet heating generator 10 also comprises a motor drive unit shaft 40 extending from the motor 32 into the fan housing 12 and the outer end portion 42 of the shaft 40 is firmly attached to the copper or aluminum squirrel cage fan assembly 22. As indicated previously, the fan assembly 22 has copper or aluminum heat absorption plates 26 and 28 located on the sides of the assembly 22. The heat absorption plate 26 has a hole or aperture 48 in the center of it to permit air to flow through the fan blades or scroll designated by the number 50. The copper or aluminum fan blades 24 are located in the middle of the assembly 22. These blades 24 are all thermally bonded to provide for better heat conduction.

As indicated previously, on each side of the inside of the fan housing 12 is a set of permanent magnets 14 and 16. In the preferred embodiment, these are made of ceramic or rare earth materials. These permanent magnets 14 and 16 are arranged in a polarity sequence, such as north-south, north-south polarity or they may have more than one pole on a single face. Between both sets of permanent magnets 14 and 16 and the adjacent structure associated with the assembly 22 there is a minimum air gap to provide for a friction free rotation. The fan housing 12 has an intake port portion or conduit 52 with an aperture 53 and an exhaust port conduit or portion 54 with an aperture 55 so that air entering the fan housing 12 through the intake port aperture 53 passes through the copper or aluminum fan blades or scrolls 50, is heated and then discharged through the exhaust port aperture 55 and proceeds to the desired destination as will be hereinafter described.

Figure 3:
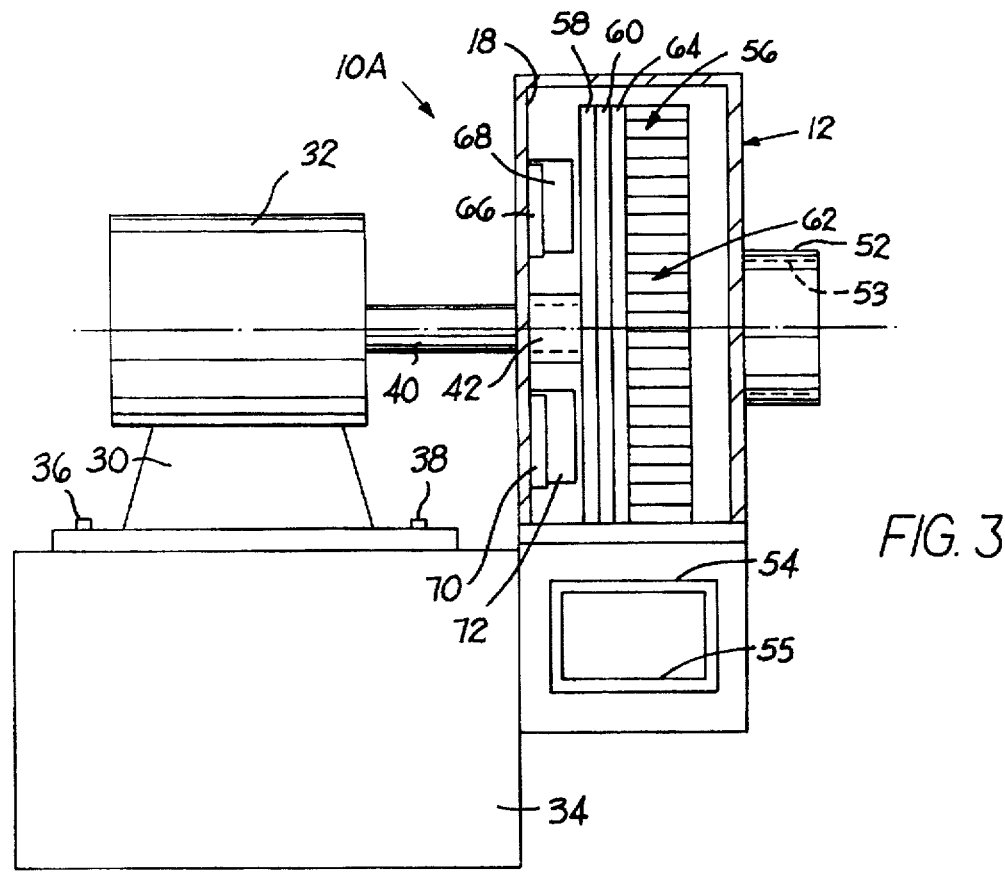
FIG. 3 is a side elevational view of the portion of the auxiliary motor vehicle heating system invention illustrated in FIG. 1 with a portion partially in section taken on the line 2—2 in FIG. 1 substantially similar to that illustrated in FIG. 2 but illustrating an alternative arrangement for the partially sectioned portion.

FIG. 3 illustrates an alternative embodiment that has all of the structure of the embodiment set forth in FIGS. 1 and 2 except that this embodiment has a different fan assembly and associated magnet arrangement. This alternative embodiment is designated generally as 10A The fan assembly is designated generally by the number 56 and includes a combination of a heat absorption plate 58 and a condensing plate 60 that are not present in the fan assembly 22 of the embodiment 10 illustrated in FIGS. 1 and 2. As illustrated in FIG. 3, the fan assembly 56 includes a heat absorption plate 58 and an adjacently located condensing plate 60. The fan blade combination 62 in this embodiment is also attached to an adjacent plate 64 that abuts up against the condensing plate 60 whereas in the previous embodiment the fan blade combination 50 had an absorption plate 26 or 28 on each side of it.

This fan assembly 56 can be made in two forms in the preferred embodiments. In the first form the heat absorption plate 58 and the condensing plate 60 are made respectively from copper and from a ferro-magnetic material. Also, the plate 64, on which the copper blade combination or scrolls 62 are attached is made from copper as is the blade combination 62. These are all thermally bonded together. In the second form, the arrangement is the same except that an aluminum plate 64 is provided on which an aluminum blade combination or scrolls 62 are attached. These also are thermally bonded together.

Facing and parallel to the copper heat absorption plate 58 are two sets of permanent magnets 66 and 68 and 70 and 72. These are affixed to the inside 18 of the fan housing 12 in a north-south polarity sequence. These permanent magnets may be made of ceramic or rare-earth magnetic material. Magnets 66 and 68 are north pole polarity and magnets 70 and 72 are south pole polarity. Otherwise, the arrangement in FIG. 3 is the same as the previously described embodiment set forth in FIGS. 1 and 2. Since the same fan housing 12 that was used for the structure 10 set forth in FIGS. 1 and 2 is also used for the structure 10A set forth in FIG. 3, cool air passing through the aperture 53 of the intake port conduit 52 goes through the squirrel cage fan blade assembly 62, is heated and is then discharged through the aperture 55 of the exhaust port conduit 54.

Also, as indicated in FIG. 2, the motor 32 is connected to a source of electrical power designated by the number 74 via the electrical connector 76 that is connected to a motor controller 78 that is in turn connected to the source of electrical power 74 via the electrical connector 80. The motor controller 78 permits the magnet heating unit to be shut off or turned on as well as supplying varying amounts of electrical power to the motor 32 to cause it to operate at varying speeds that has the result of supplying more or less heat or hot air from the fan housing outlet conduit or portion 54.

Figure 4:
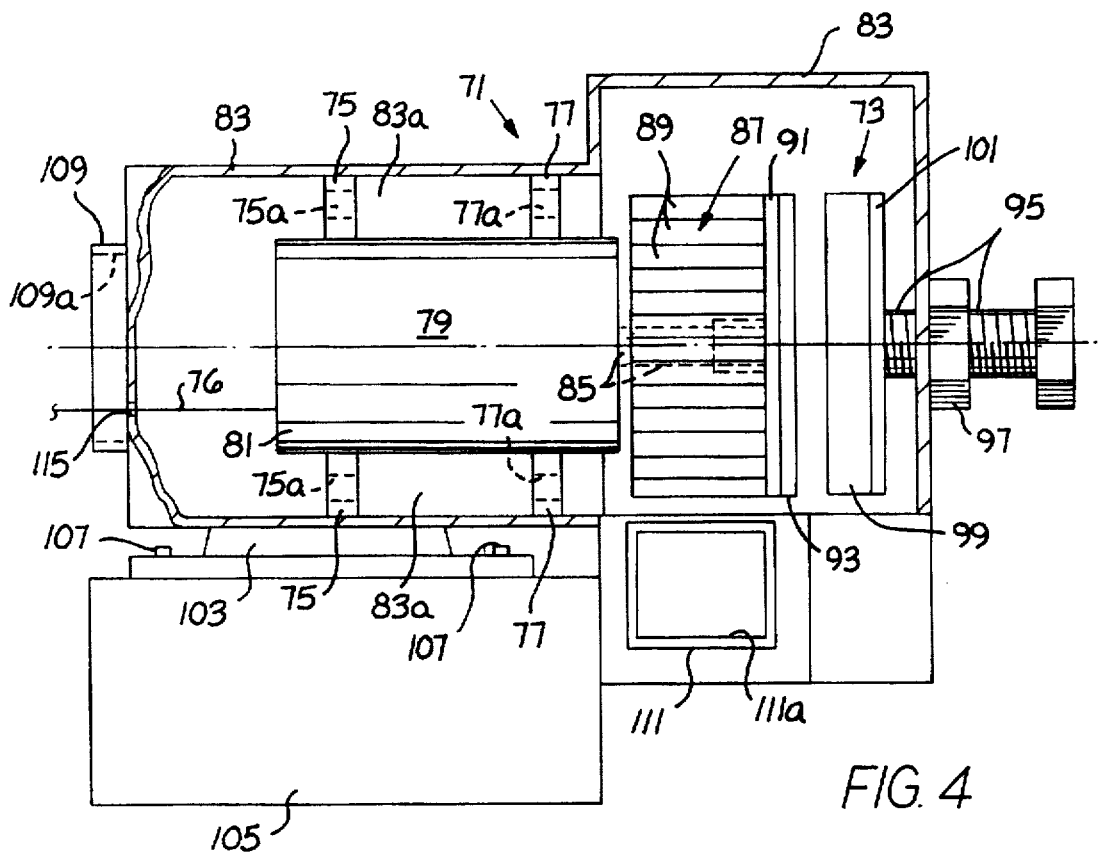
FIG. 4 is a side elevational view of an additional embodiment of the auxiliary motor vehicle heating system invention with a portion partially in section taken substantially on a line similar to 2—2 in FIG. 1 and having other portions broken away for ease of illustration.

FIG. 4 illustrates a modification to the previous embodiments 10 and 10A set forth in FIGS. 1 through 3. This embodiment that is designated generally by the number 71 is a permanent magnet heating unit that can have an AC or DC motor as its drive unit. It also has a retractable permanent magnet core assembly that is designated generally by the number 73. This means that the embodiment 71 can blow cool air or hot air depending on the position of the permanent magnet assembly 73. The heating unit has two pairs of heat sinks designated 75 and 77 on a motor housing 79 which dissipate the heat conducted to the housing 79 by the motor 81 into the incoming air to be heated.

This permanent magnet heating unit 71 comprises a hollow fan housing 83 which surrounds and contains the motor 81 whose housing 79 as previously indicated, is attached to the two sets of heat sinks 75 and 77. These heat sinks 75 and 77 permit heat that is conducted by the motor 81 to be radiated into an air passageway 83a. A motor shaft 85 extends from the motor 81 into a fan assembly 87 that is firmly attached to the shaft 85 and is located within the hollow fan housing 83. This fan assembly has copper or aluminum blades or scrolls 89, a ferro magnetic condensing plate 91, and a copper or aluminum heat absorption plate 93. These are all thermally bonded for heat conductive purposes. This fan assembly 87 is heated by the adjustable permanent magnet core assembly 73. This magnet core assembly 73 has a threaded bolt 95 and to provide for locking the bolt 95 in position, a locking hex nut 97. This bolt 95 can be rotated to produce a desired air gap by turning it. This will provide a sufficient air gap by turning the cam screw only about 90 degrees in rotation. Attached to the threaded screw or bolt 95 is a permanent magnet core 99. This magnet core 99 may have 2, 4, 6, 8, etc. poles on a single face. This magnetic core 99 is affixed to a ferro-magnetic backing plate 101 that is in turn rigidly attached to the end of the bolt 95.

The fan housing 83 is supported by a motor base 103 which is bolted to a unit base 105 by threaded bolts 107. An air intake port conduit 109 and an exhaust port conduit 111 are provided in the housing 83 in such a manner that air entering the intake aperture 109a of the intake port conduit 109 passes through apertures 75a and 77a of the heat sinks 75 and 77 and around them which are heated by the motor housing 79, enters into the copper or aluminum blades or scrolls 89, is heated again and discharges through the exhaust aperture 111a of the exhaust port portion 111 and continues to its desired destination. It will be noted that the motor 81 is electrically connected to the electrical conduit 76 that passes through an aperture 115 in the fan housing 83. The connector or conduit 76 is electrically connected to the power source 74 via the motor controller 78 as illustrated in FIG. 2.

Figure 5:
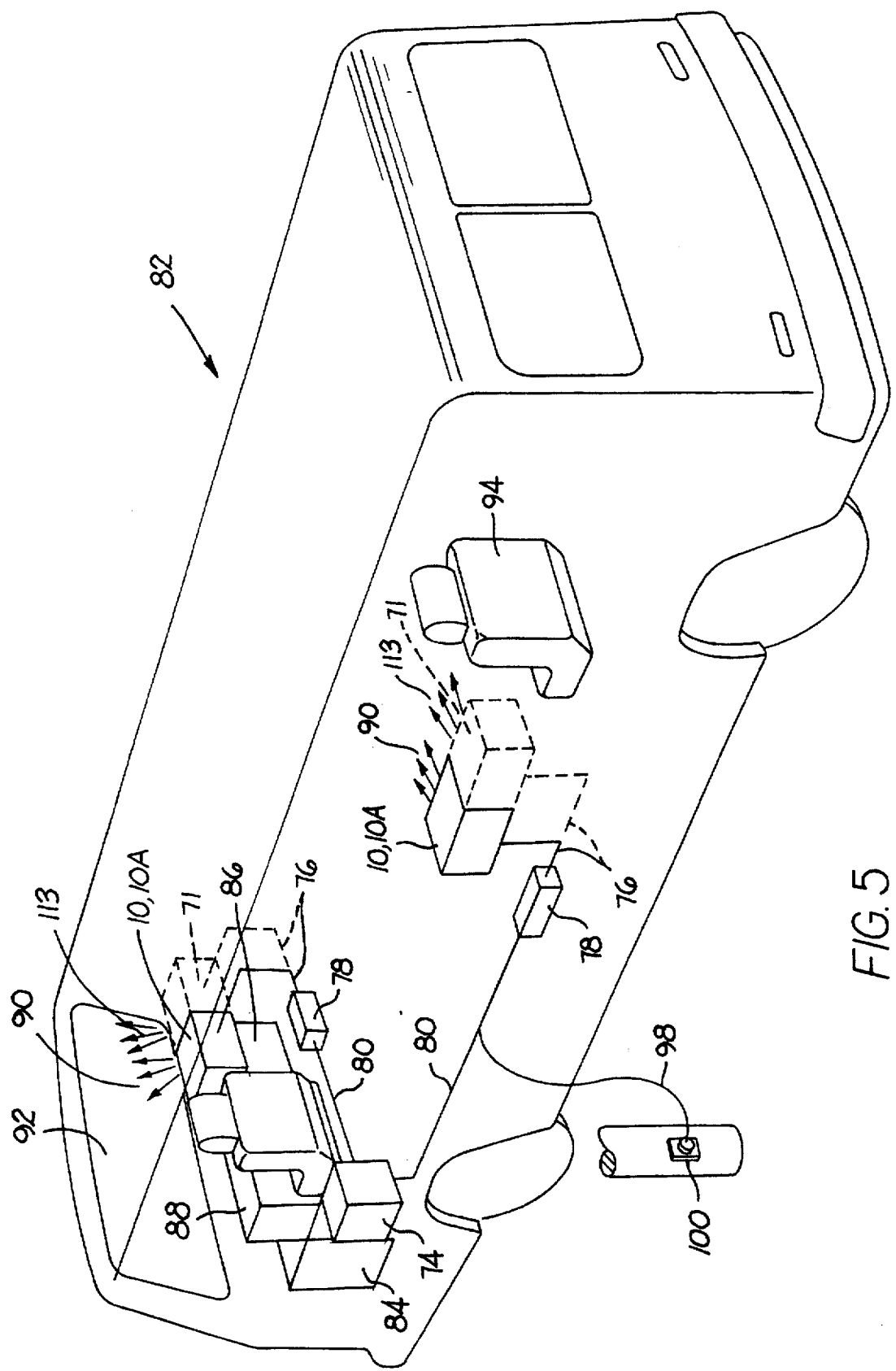
FIG. 5 is a perspective view of a motor vehicle illustrating the auxiliary motor vehicle heating system invention in position for use in a motor vehicle.

FIG. 5 illustrates the permanent magnet heat generator 10 or 10A and/or the embodiment 71 in use within a motor vehicle designated generally by the number 82. As indicated, the motor vehicle 82 has an engine 84 with its conventional heating system 86. In addition to the conventional heating system 86, this invention provides an important advantage with the heat generator 10 or 10A or 71 that can be located at various locations within the vehicle 82. As indicated, the heat generator 10, 10A or 71 can be located on the dash board 88 of the vehicle 82. With the heat generator 10 or 10A or 71 located on the dash board 88 of the vehicle 82 the hot air 90 exiting from the exhaust port conduit 54 (not shown in FIG. 5) of the embodiment 10 or 10A or the hot air 113 exiting from the exhaust port conduit 111 (not shown in FIG. 5) of the embodiment 71 can be directed to clear the windshield 92 of the vehicle 82.

Another heat generator 10 or 10A or 71 is located adjacent a passenger seat 94 so that hot air 90 exiting from the exhaust port conduit 54 (not shown in FIG. 5) or hot air 113 from the exhaust port conduit 111 (not shown in FIG.5) of the embodiment 71 can be directed to the passenger seat 94 area to provide the comfort of the hot air or cool air to any passengers located in this area of the vehicle 82. It will be noted that in view of the motor controllers 78 the amount of hot air 90 exiting from the exhaust port conduit 54 or the air 113 exiting from the exhaust port conduit 111 can be varied to suit the passenger's needs or to adequately clear the windshield 92.

The electrical power source 74 can be a battery located in the vehicle 82. Alternatively, as indicated in FIG. 5, a flexible power cord 98 can be provided that can be plugged into an external source of electrical power 100 such as that available in a trailer park or the like.

The heat generators 10, 10A and 71 are manufactured from conventional materials using conventional manufacturing processes except as previously noted. In order to use the invention, the heat generator 10 or 10A or 71 is connected to a suitable power source such as the source 74 set forth in FIG. 2 or to an external electrical power source outside of the vehicle 82 such as that designated 100 in FIG. 5. As illustrated in FIG. 5, a plurality of heat generators 10, 10A and/or 71 can be provided for providing heat for the vehicle 82 for a variety of uses. These heat generators 10, 10A and 71 are individually controllable through the use of the motor controller 78 that in itself is of conventional construction known in the art. As indicated previously, in the case of the embodiment 71, by adjusting the position of the magnetic core 99 and its backing plate 101 by suitably turning the bolt 95, cool air as well as hot air 113 can be caused to exit from the aperture 111a of the exhaust port conduit 111.

Although the invention has been described in considerable detail with reference to certain preferred embodiments it will be appreciated and understood that various changes and modifications may be made without departing from the spirit and scope of the invention as defined in the appended claims.

What is claimed is:

1. An auxiliary motor vehicle heating system for use within a motor vehicle that has a main source of power for propelling the motor vehicle and an associated heat source comprising a source of heat separate from said main power source for heating air, said separate heat source comprising: an electrically operated motor; magnetic means for generating a magnetic field operatively associated with said motor including at least one permanent magnet and a fan assembly having fan blades and at least one heat absorption plate comprising a non-ferrous metal operatively associated with said permanent magnet; controlling means connected to said motor for controlling said motor comprising means for supplying variable amounts of electrical power to said motor to cause said motor to operate at different speeds; a power source connected to said controlling means for controlling said motor; and a fan housing surrounding at least a portion of said fan assembly, said fan housing having an intake aperture and an exhaust aperture located to permit air to enter said intake aperture and enter the fan blades of said fan assembly and exit said exhaust aperture.

2. The auxiliary motor vehicle heating system of claim 1 wherein said vehicle has a windshield and said exhaust port is located within said vehicle to provide air to clean the windshield of said vehicle.

3. The auxiliary motor vehicle heating system of claim 1 wherein said vehicle has a passenger seat area for passengers and said exhaust port is located within said vehicle to provide air to passengers located in said passenger compartment.

4. The auxiliary motor vehicle heating system of claim 1 wherein said permanent magnet is adjustable to different positions.

5. The auxiliary motor vehicle heating system of claim 1 further comprising at least one heat sink associated with said motor for conducting heat away from said motor.

* * * * *